Aug. 23, 1949.  W. B. BARRIGER  2,479,995
ELECTRICAL DISTRIBUTION SYSTEM
Filed June 13, 1946  2 Sheets-Sheet 1
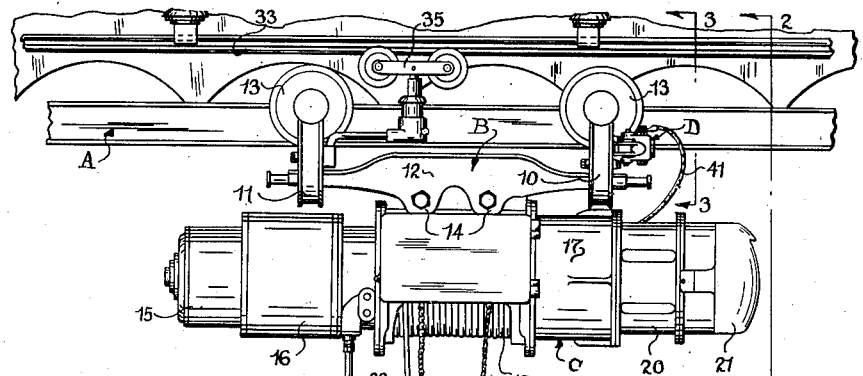
Fig. 1
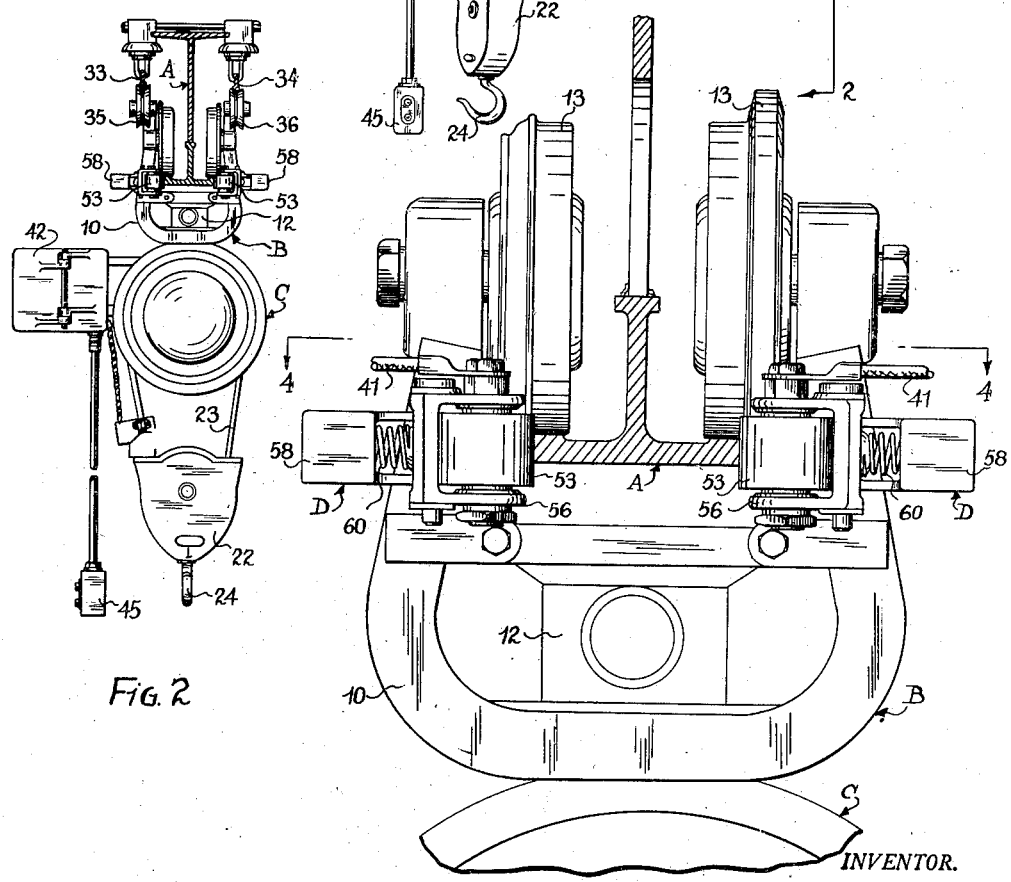
Fig. 2
Fig. 3
INVENTOR.
WILLIAM B. BARRIGER
BY
Kwis, Hudson, Boughton & Williams
ATTORNEYS Aug. 23, 1949.  W. B. BARRIGER  2,479,995
ELECTRICAL DISTRIBUTION SYSTEM
Filed June 13, 1946  2 Sheets-Sheet 2
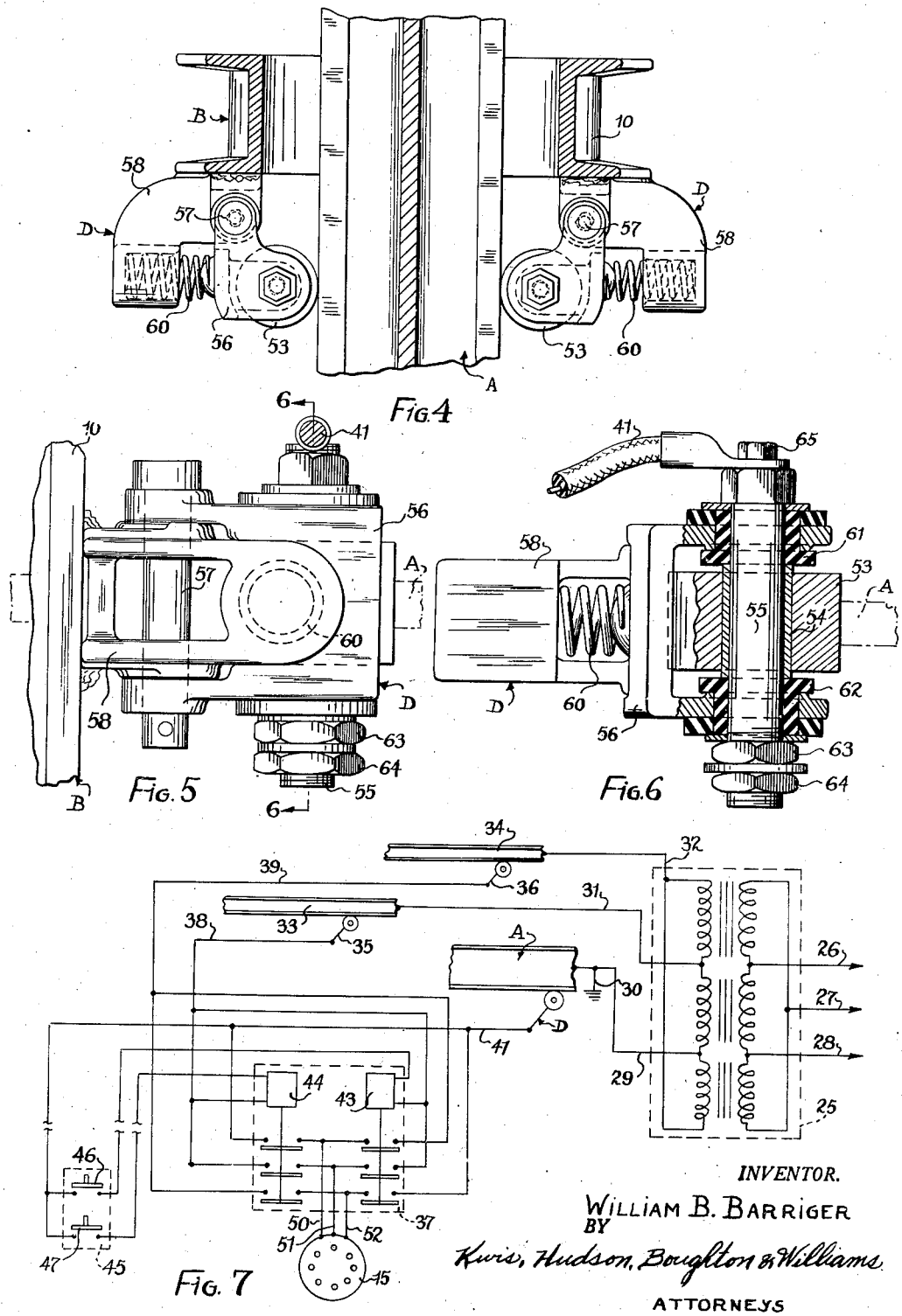
INVENTOR.
WILLIAM B. BARRIGER
BY
Kwis, Hudson, Boughton & Williams
ATTORNEYS Patented Aug. 23, 1949

2,479,995

UNITED STATES PATENT OFFICE 2,479,995

ELECTRICAL DISTRIBUTION SYSTEM

William B. Barriger, Glen Burnie, Md., assignor to The Cleveland Crane & Engineering Company, Wickliffe, Ohio, a corporation of Ohio Application June 13, 1946, Serial No. 676,409

5 Claims. (Cl. 191—45)

The present invention relates to overhead, material handling systems and, more particularly, to a three wire, electrified, overhead, monorail, material handling system comprising movable load supporting carriers.

In systems of the character referred to, the load supporting carriers are suspended from and travel along an overhead track. The carriers may be either hand-propelled or motor-driven but, in any event, some or all of the carriers include electrically-operated mechanism; for example, a three phase motor which may propel the carrier, operate a hoist or the like. One wire or line of the electrical system is usually grounded and includes the supporting track and carrier frame and the electrical connection between the track and carrier is through the load supporting wheels of the carrier. The other two wires or lines of the electrical system usually comprise conductor bars, one located at either side of and supported from the track, which conductor bars are engaged by current collectors carried by the carrier and insulated from the frame thereof. Systems of the character referred to are relatively simple in construction and economical to construct and permit movement of the carriers in opposite directions; however, an operator either intentionally or accidentally touching the carrier frame receives an electrical shock in the event that there is a poor electrical contact between the load supporting wheels of the carrier and the supporting rail, which poor contact may be the result of oxidation of the rail and/or wheels or the accumulation of dirt on the rail, etc.

One of the principal objects of the present invention is the provision of a novel and improved, three wire, electrified system of the character referred to, so constructed and arranged that it will be impossible for an operator to receive an electrical shock by touching the frame of the carrier, which system will be relatively simple in construction and upon which the carriers may be moved in either direction.

Another of the objects of the invention is the provision of a novel and improved, three wire, electrified, overhead, carrier system of the character referred to in which the carrier frame and supporting track form one of the wires or lines of the electrical system but which nevertheless is so constructed and devised that it will be impossible for an operator to receive an electrical shock by touching the carrier frame.

Another object of the invention is the provision of a novel and improved, electrified, overhead, material handling system in which the carrier supporting rail means forms one wire or line of the system but in which the carrier frame is excluded from the electrical circuit, thus making it impossible for an operator to receive an electrical shock by coming in contact with the carrier frame.

The invention resides in certain constructions and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which Fig. 1 is a side elevational view of a portion of a three wire, electrified, overhead, monorail carrier system embodying the present invention;

Fig. 2 is a sectional view approximately on the line 2—2 of Fig. 1;

Fig. 3 is an enlarged sectional view approximately on the line 3—3 of Fig. 1;

Fig. 4 is a sectional view approximately on the line 4—4 of Fig. 3;

Fig. 5 is a fragmentary side elevational view looking from the left of Fig. 4;

Fig. 6 is a sectional view approximately on the line 6—6 of Fig. 5; and

Fig. 7 is a schematic wiring diagram of a part of the electrical circuits of the carrier system shown in Fig. 1.

The invention is herein illustrated and described as embodied in a material handling, three wire, electrified, overhead, tramrail carrier system of the monorail type manufactured by The Cleveland Crane & Engineering Company and known commercially as "Cleveland Tramrail." The carrier shown is of the hand-propelled, motor-driven hoist type and includes a three-phase, alternating current, induction motor adapted to be operated by a pendant push button station connected to the carrier. It is to be understood, however, that the invention is susceptible of various modifications and alternative constructions and is applicable to material handling systems other than the particular system illustrated and to all types of carriers including tractor units. For the most part, material handling system shown and described herein is well known in the art and only those parts which are necessary to a complete understanding of the present invention are herein illustrated and described in detail.

Referring to the drawings, only a very limited portion of a complete system is shown. Generally speaking, the system shown comprises an overhead monorail A supported from above in some suitable manner and along the lower flanges of which the carriers are adapted to travel. As previously stated, the carrier, designated generally by the reference character B, includes an electric hoist, designated generally as C. The carrier proper comprises two trucks including yoke members 10 and 11 connected by a load bar 12. In addition to the yoke members 10, 11, the trucks each comprises a pair of flanged wheels 13 rotatably connected to the yoke members in a commercially known manner and adapted to support the carrier and travel along the flanges of the monorail A. The load bar 12 is pivotally connected to the yoke members 10, 11 and includes downwardly extending flanges 14 to which the hoist C is bolted or otherwise connected thereto.

The hoist C is of commercial construction and will not be described in detail. Suffice it to say that it includes a three-phase, alternating current motor 15 of the enclosed type and especially designed for hoist service and bolted to a gear case 16 which, in turn, is bolted to the frame 17 of the hoist. The motor 15 is connected to the winding drum 18 by reduction gearing enclosed within the gear case 16 and which gear case also encloses an externally adjustable, multiple disk load brake. The hoist mechanism also comprises an externally adjustable, solenoid operated, disk brake enclosed within the housings 20, 21. The load block 22 operatively connected to the cable 23 secured to the winding drum 18 includes a load hook 24 swiveled to the load block proper in the usual manner.

Electric current for operating the motor 15 is supplied to the carrier system from a three-phase, alternating current line by a transformer 25 which insulates the carrier system from the power lines 26, 27, 28. One line or lead 29 of the transformer is grounded as at 30 and connected to the load supporting rail A. The other two lines or leads 31, 32 are connected to conductor bars 33, 34 located at opposite sides of and insulated from the rail A to which they are connected in a conventional manner. From the conductor bars 33, 34 current is conducted to the carrier proper by current collectors 35, 36 of commercial construction in continuous engagement with the trolley conductor bars 33, 34, which current collectors are insulated from the frame of the carrier B and are located at opposite sides of the rail A and underneath the trolley conductor bars.

The current collectors 35, 36 are connected to a commercial solenoid operated, reversing motor control panel 37 by insulated wires 38, 39, respectively, and the third line or wire of the system, that is, the rail A is connected to the circuit breaker by a current collector, designated generally by the reference character D, of particular construction, hereinafter described in some detail but which may be similar to the current collectors previously referred to and which engages the rail A. The current collector D, like the current collectors 35, 36, is insulated from the frame of the carrier and is connected to the control panel 37 by an insulated wire 41. Alternatively the wire 41 may be connected directly to the motor 15. The motor control panel 37 is located within the housing 42 on the carrier B and is of conventional construction and the forward and reverse solenoids 43, 44 thereof are adapted to be selectively energized from a pendant control station 45 connected to the hoist frame and comprising manually operable, instantaneous forward and reverse switches 46, 47, respectively. The wires or lines 50, 51, 52 which connect the motor control panel 37 with the motor 15 are insulated from the frame of the carrier as are all parts of the electrical system. Attention is called to the fact that the switches 46, 47 are shown in the line 41, thus making it impossible to operate the motor 15 on single phase because neither of the solenoids 43, 44 can be operated unless there is an electrical contact between the current collector D and the rail A.

In the embodiment shown, two current collectors D are employed, one located at and engaging each side of the load supporting flange of the rail A; however, it will be understood that one current collector may be employed, if desired, or that current collectors of any suitable construction other than the particular construction shown may be used. Referring particularly to Figs. 3 to 6, each of the current collectors D shown comprises a rail-engaging wheel 53 rotatably supported on a bushing 54 surrounding a vertical bolt 55 insulated from and fixedly secured in the forked ends of a Y-shaped member 56 pivotally connected as by a pin 57 to a bracket 58 welded to the side of the yoke member 10. Opposite current collectors D are welded to opposite sides of the yoke member 10 as shown in Fig. 3. The pivoted members 56 are continuously urged in a direction to engage the wheels 53 with the rail A by compression springs 60 interposed therebetween and the brackets 58.

The manner in which the bolts 55 are fixedly secured in the ends of the members 56 is immaterial. As shown, opposite ends of each bolt project through two-part grommets 61, 62 formed of insulating material, the flanges of which prevent the wheel 53, the head of the bolt, and the nut or nuts 63, 64 on the lower end of the bolt from contacting the arms of the member 56. In the embodiment shown, the outer ends of the springs 60 project in apertures formed in bosses on the brackets 58 and the inner ends thereof engage a spherical-like projection on the adjacent sides of the members 56; however, any suitable arrangement may be employed for supporting the springs. The lead or wire 41, previously referred to, is connected to the upper ends of both bolts 55 by headed screws 65 in a conventional manner. Alternatively any suitable means may be employed for connecting the wires 41 with the bolts 55.

From the foregoing description, it will be apparent that it is impossible with the present construction for an operator to receive an electrical shock by touching the frame of the carrier B regardless of the quality of the electrical contact between the supporting wheels 13 of the carrier and the carrier rail A because the carrier wheels 13 are not a part of the electrical circuit. Because the carrier frame is not directly a part of the electrical circuit, it is impossible for an operator to establish an electric circuit through himself back to ground and this fact is independent of the quality of the electrical contact between the current collector or collectors D and the rail A. While the invention has been described in connection with a three-phase, alternating current, electrical system, it will be understood that it may be employed with any system in which the carrier supporting rail means forms one line or wire of the electrical system, and with single-phase, two-phase, three wire systems, or direct current systems as well as with three-phase systems; for example, a single-phase system or a two-phase, three wire ssytem.

While the preferred embodiment of the invention has been described in considerable detail, it is to be understood that the invention is not limited to the particular construction shown but is applicable to electrified, overhead, monorail material handling systems generally where it is possible or required in the normal operation of the system for the operator to contact the frame of one or more of the carriers, etc., containing electrically operated mechanism. It is my intention to hereby cover all adaptations, modifications and uses of the invention which come within the practice of those skilled in the art to which the invention relates and within the scope of the appended claims.

Having thus described my invention, I claim:

1. In an electrified overhead material handling system comprising a grounded carrier supporting rail forming one of the wires or conductors of the system and a trolley conductor insulated from ground forming another wire or conductor of the electrical system, a carrier comprising a metal frame suspended from and movable along said rail and including an electrically operated device, current collectors supported on said carrier each insulated from said metal frame and engaging said rail and said trolley conductor respectively, and electrical conductor means insulated from said metal frame of said carrier for operatively connecting said electrically operated device with said current collectors.

2. In a three wire electrified overhead monorail material handling system comprising a grounded carrier supporting rail forming one of the wires and two trolley conductors located at opposite sides of the rail and insulated therefrom and forming the other two wires of the electric system, a carrier comprising a metal frame suspended from and movable along said rail and including an electrically operated device, current collectors on said carrier each insulated from said metal frame and engaging said rail and both of said trolley conductors respectively, and an electric circuit on said carrier and insulated from said metal frame for electrically connecting said electrically operated device with said current collectors.

3. In a three wire electrified overhead monorail material handling system comprising a grounded carrier supporting rail forming one of the wires and two trolley conductors located at opposite sides of the rail and insulated therefrom and forming the other two wires of the electrical system, a carrier comprising a metal frame suspended from and movable along said rail, a three phase electric motor on said carrier, current collector means on said carrier each insulated from said metal frame and engaging said rail and both of said trolley conductors respectively, and electrical conductor means insulated from said metal frame of said carrier for connecting said motor with said current collectors.

4. In a three wire electrified overhead monorail material handling system comprising a grounded carrier supporting rail forming one of the wires and two trolley conductors located at opposite sides of the rail and insulated therefrom and forming the other two wires of the electrical system, a carrier comprising a metal frame suspended from and movable along said rail and including an electrically operated device, current collector means on said carrier each insulated from said metal frame and engaging said rail and both of said trolley conductors respectively, electrical conductor means insulated from said metal frame of said carrier for operatively connecting said electrically operated device with said current collectors.

5. In a three wire electrified overhead monorail material handling system comprising a grounded carrier supporting rail forming one of the wires and two trolley conductors located at opposite sides of the rail and insulated therefrom and forming the other two wires of the electrical system, said rail having a carrier supporting flange along the lower edge thereof, a carrier comprising a metal frame suspended from and movable along said rail and including an electrically operated device, current collector means on said carrier insulated from said metal frame and engaging said rail and both of said trolley conductors, said current collector means engaging said rail comprising a pair of collector wheels located at opposite sides of the rail and resiliently pressed into engagement with opposite sides of the carrier supporting flange thereof, and means insulated from said metal frame of said carrier for operatively connecting said electrically operated device with said current collectors.

WILLIAM B. BARRIGER.

REFERENCES CITED

The following references are of record in the file of this patent:

UNITED STATES PATENTS

| Number | Name | Date |
|---|---|---|
| 323,199 | Pendleton | July 28, 1885 |
| 1,843,743 | Shaffer | Feb. 2, 1932 |
| 2,245,135 | Martin | June 10, 1941 |
| 2,348,841 | Oswald | May 16, 1944 |

FOREIGN PATENTS

| Number | Country | Date |
|---|---|---|
| 136,047 | Austria | Dec. 27, 1933 |